Oct. 18, 1966   R. T. AUDETTE   3,280,285
COMPACT, LOW COST, VERSATILE, THERMOSTATIC MOTOR PROTECTOR
Filed Nov. 25, 1963
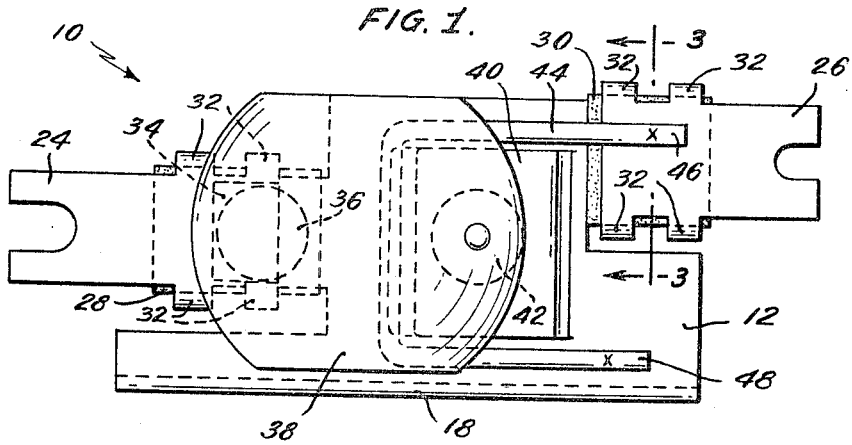
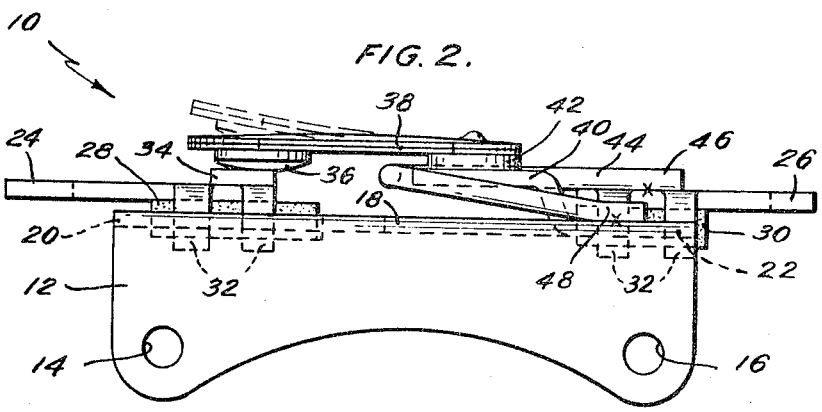
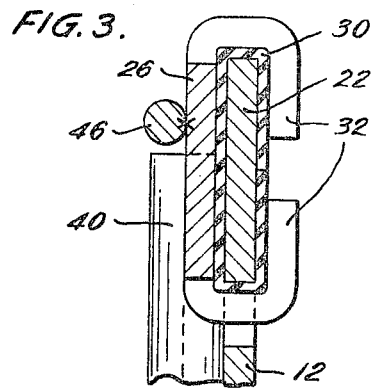
INVENTOR.
RICHARD T. AUDETTE,
BY
ATTY.
WITNESS: Edward J. Connors Jr.

United States Patent Office 3,280,285
Patented Oct. 18, 1966

3,280,285
COMPACT, LOW COST, VERSATILE, THERMO-
STATIC MOTOR PROTECTOR
Richard T. Audette, Attleboro, Mass., assignor to Texas
Instruments Incorporated, Dallas, Tex., a corporation
of Delaware
Filed Nov. 25, 1963, Ser. No. 325,819
8 Claims. (Cl. 200—122)

This invention relates to electrical control devices which are particularly suited for, although not limited to, controlling circuits for electrical motors having one or more windings. The invention, with regard to certain more specific features, is particularly concerned with the provision of a new and improved motor protector.

Among the several objects of this invention may be noted the provision of an electrical control device for controlling the circuits of and protecting the windings of an electric motor.

It is a further object of this invention to provide a new and improved motor protector which is versatile in use, compact, low-cost and easily assembled, which embodies a minimum number of parts, which is simple in construction and economical to manufacture and assemble and which provides for simple and low-cost installation on motors which are to be protected.

It is a further object of the instant invention to provide an electrical control device affording "complete protection" of a motor by which is meant protecting both the start and the main windings separately as well as both of them combined against any locked rotor or overload condition without overprotecting the motor in any of these situations.

Other objects will be in part apparent and in part pointed out hereinafter.

The invention accordingly comprises the elements and combinations of elements, features of construction and arrangements of parts which will be exemplified in the structures hereinafter described and the scope of the application of which will be indicated in the appended claims.

In the accompanying drawings in which one of the various possible embodiments of the invention is illustrated:

FIG. 1 is a top plan view of a device according to the instant invention;

FIG. 2 is an elevational view of the device shown in FIG. 1;

FIG. 3 is an enlarged sectional view taken on line 3—3 of FIG. 1.

Similar reference characters indicate corresponding parts throughout the several views of the drawings.

Dimensions of certain of the parts as shown in the drawings may have been modified or exaggerated for the purposes of clarity of illustration.

Referring now to the drawings, there is shown an electrical switch according to the instant invention, generally indicated by reference numeral 10. Switch 10 includes a base or mounting plate 12 formed of a suitable, electrically conductive material, such as, for example, cold rolled steel which has been tin plated to provide corrosion resistance.

Mounting plate 12 includes a pair of mounting holes 14 and 16 for receiving a mounting fastener to mount the device 10 on a suitable portion of the motor or other device to be protected. If desired, mounting plate 12 may be bent as at 18 to provide an alternate orientation of the device with respect to the surface upon which it is to be mounted.

Mounting plate 12 also includes first and second projections 20 and 22 formed as for example by stamping, on the plate 12. Mounted on the projections 20 and 22 are, respectively, electrically conductive terminals 24 and 26, each of which has a portion thereof projecting away from the base plate 12 for connection into an electrical circuit. Terminals 24 and 26 are electrically insulated from plate 12 and projections 20, 22, by electrical insulating sheets 28 and 30 formed of a suitable, electrically insulating material such as, for example, the insulating material sold under the trademark Copaco, bonded to the resinous film sold under the trademark Mylar. Each of terminals 24 and 26 includes retaining fingers or projections 32. The terminals are mounted to the projections 20, 22, by wrapping sheets 28 and 30 about projections 20 and 22, respectively, and then by crimping fingers 32 about the projections 20 and 22 to provide a tight, frictional, electrically insulated mounting of the terminals on the projections.

Mounted on terminal 24 is an electrical contact 34 formed of a suitable electrically conductive material such as, for example, fine silver or fine silver over nickel. Contact 34 is electrically connected to terminal 24 as, for example, welding, riveting or the like. Contact 34 is positioned on terminal 24 for engagement with a movable electrical contact 36 formed of a suitable, electrically conductive material such as, for example, fine silver. Contact 36 is mounted on and electrically connected, for example, riveting, welding or the like to one end of a snap-acting, thermally responsive member 38.

Member 38 generally comprises a relatively thin elongated, bimetallic strip having a dished or non-developable portion which is responsive for its snap action. Snap-acting element or disc 38 is of the type, for example, shown and described in United States Patent No. 1,448,-240, dated March 23, 1923 and filed in the name of John A. Spencer.

The other end of snap-acting element 36 is cantilever mounted on and electrically connected to a portion 40 of base plate 12. Mounting portion 40 takes the form of a tab struck from and bent out of the plane of plate 12 as best seen in FIGS. 1 and 2. The disc 38 is electrically connected to tab 40 by means of a welding slug 42. Welding slug 42 and its co-operation with disc 38 for mounting and electrically connecting the disc 38 to the tab 40 is the subject of and is more fully described in copending application Serial No. 291,202, filed June 27, 1963, in the name of Montague R. Duval, and entitled "Means and Method for Making Electrical Connections," assigned to the assignee of this application and to which reference may be had for details of this feature. Briefly, welding slug 42 includes a head portion and a shank portion, the shank portion being received within a suitable aperture (not shown) in disc 38. The slug 42 is welded to disc 38 to form a subassembly therewith and thereafter is welded to the tab 40 to electrically connect and cantilever mount the disc 38. In an alternate form of construction, the shank portion of slug 40 extends through the aperture in the disc 38 and beyond the other side of disc 38 and engages a complementary projection (not shown) bent into tab 40 and to which it is welded to form the electrical connection between the disc 38 and the tab 40 and to cantilever mount the disc 38 on the tab 40.

The switch 10 also includes an electrical heater member 44 having a generally U-shaped configuration and formed of a suitable heat resistant material such as the nickel chromium alloy sold under the trademark Chromel. The free end 46 of one of the legs forming the generally U-shape is electrically connected as, for example, by welding to terminal 26 while the free end 48 of the other leg of heater member 44 is electrically connected as, for example, by welding, to a portion of the base plate 12.

As best seen in FIGS. 1 and 2, U-shaped heater member 44 extends in a plane generally parallel to the plane of disc 38, and is located in close heat transfer relationship with the disc 38. In addition, the plane of heater member 44 is generally parallel to the plane of base plate 12 and is in a good thermal transfer relation with the base plate 12. It will be noted that the tab 40 is of a generally rectangular configuration generally conforming to the interior configuration of U-shaped heater 44, and that the tab and heater lie in generally the same plane in intimate heat transfer relationship with the heater. Thus, heater member 44 is disposed in intimate thermal juxtaposition with both disc 38, tab 40 and base plate 12. Since disc 38 is welded to tab 40, a direct heat conductive connection therebetween is advantageously afforded to provide for rapid and efficient heat transfer therebetween. It will be noted that in this arrangement tab 40 acts as a heat sink and in a less direct and immediate manner, base plate 12 also functions as a heat sink.

It will be noted that since base plate 12 is formed of an electrically conductive material, mounting holes 14 and 16 can function as additional terminals when desired as will be described more fully hereinafter. It will also be noted that the dished portion of disc 38 may be deleted and that disc 38 may function as a "creep-acting" member.

As noted in the objects of the invention, the instant device provides "complete protection" of a motor including both the "start" winding and the "run" or "main" winding or either of them. The switch 10 provides such protection against any locked rotor or overload condition without overprotecting the motor in any of these situations. The instant device permits operation of the electrical motor which is to be protected at its maximum possible limits without permitting nuisance trip-outs thereby permitting a motor of minimum size and capacity and hence cost to be used. In addition, the switch 10 is capable of being mounted in any desired location on the motor which it is desired to protect. More particularly, it is not necessary that the instant device be located in close heat transfer relationship with the windings which it is desired to protect. The construction of the instant invention permits mounting the switch 10 in a recessed location within the motor whose ambient is not closely related to that of the motor windings, or in an open location within the motor where the switch 10 experiences relatively heavy cooling from the motor fan.

The operation of the switch 10 is as follows: For a normally ventilated location in a motor housing and a start winding with a relatively fast rate of rise, terminal 24 is electrically connected to one side of the line into which the motor to be protected is to be connected. Terminal 26 is electrically connected to a common junction of the main and start windings.

As can be seen, the electrical path through the switch 10 is, then, starting from the junction of the main and start windings, from terminal 26 to end 46 of heater wire 44, to the other end 48 of heater wire 44 to the base plate 12 through tab 40 and slug 42 to disc 38 to the contact 36 to contact 44 and thence to terminal 24 to the line in which the motor is designed to be connected.

In normal operation, the disc 38 is in the contacts-closed, solid-line position shown in FIG. 2. The disc 38 and heater 44 are selected with values such that when a locked rotor or overload condition occurs which could deleteriously affect either the start or main windings, or both of them, the current passing through disc 38 and the heat generated by heater 44 cause disc 38 to snap to the dotted-line contacts-open position shown in FIG. 2, thereby freeing the motor and its windings from the deleterious locked rotor or overload condition.

Since no current then passes through the switch 10 or the motor to be protected the disc 38 is permitted to cool and when its preselected reset temperature is reached, the disc 38 snaps back to the contacts-closed, solid-line position shown in FIG. 2, thereby reconnecting the motor to the power source to permit its continued operation.

Since, as noted, the switch 10 may be located in a position remote from the windings of the motor to be protected, it would normally cool to its reset temperature much quicker than the motor windings. In such a case, recurring or continuing locked rotor or overload conditions could cause the temperature in the windings to exceed rated limits since the switch would reset to re-energize the motor when the disc itself reaches its reset temperatures irrespective of whether the motor windings have cooled sufficiently.

The instant device advantageously provides longer "off" or contacts-open times to permit adequate motor cooling. In the instant device, the mounting tab and base plate, because of their larger mass, cool more slowly (and heat more slowly) than the disc alone. Because of the thermal juxtaposition of the disc, heater, mounting tab and base plate, when the trip or snap open temperature of the disc is achieved, the mounting tab and base plate are at a temperature exceeding the closing or reset temperature of the disc. The connection between the disc and mounting tab also permits the disc to cool more slowly than it would by itself due to the greater mass of the tab and base plate. The tab and base plate, because of their greater mass, transmit heat to the disc until an equilibrium condition equal to the reclosing temperature of the disc is achieved. This lengthier cooling period permits the motor itself and its windings to cool off sufficiently before the disc recloses.

Analogously, under recurring or continuous overload or lock rotor conditions, the tab and base plate cool more slowly than the disc by itself and, functioning as a heat sink, transmit heat to the disc thus advantageously permitting shorter "on" times and providing more accurate sensing of conditions in the motor windings.

The construction of the instant device permits its connection into a motor circuit in a number of other ways depending on the type of motor to be protected and the conditions under which the motor is to be used. For example, under conditions of normal ventilation, that is, where the disc is mounted in a recess remote from the motor windings and is relatively unaffected by the motor fan and where the starting winding has a moderate rate of temperature rise, terminal 24 is connected into one side of the line, and terminal 26 is connected in series with the start winding. Mounting hole 14 or 16 is used as a third terminal and is connected to one end of the main winding. When connected in this manner, current passing through the main winding by-passes the heater and passes directly through the disc while current passing through the start winding passes through the disc and the heater. This advantageously permits operation of a main winding at higher heat limits.

Another alternative connection is used where the start winding possesses a moderate rate of temperature rise and the switch 10 is located in a relatively exposed position within the motor and is subject to relatively heavy cooling from the motor fan. In such a case, terminal 24 is again connected into the line, terminal 26 is connected to one end of the main winding and terminal 14 or 16 is connected to one end of the start winding. When connected in this manner, start winding current passes directly through the disc bypassing the heater, while the main winding current passes through both the disc and heater. This permits complete protection of the windings even though the ambient of the switch is unrelated to the motor winding ambient due to the exposed position of the switch.

A further feature of the instant invention is that it is capable of operation with motors adapted for use with either 110 or 220 line voltage with minimum changes in its connections. This is made possible by the use of the base 12 and in particular mounting holes 14 and 16 as an electrically conductive terminal. In such motors, conversion from 110 to 220 operation is accomplished by arranging the windings in either series or parallel connection. In 110 line voltage operation, the two main windings are arranged in parallel. Terminal 24 of switch 10 is connected to the junction of the start winding and one of the main windings while terminal 14 or 16 is connected to one end of the other main winding. When the motor is converted to 220 operation by connecting the two main windings in series, terminal 14 and 16 is not used and terminal 26 is connected to the common junction of the main and start windings.

It can thus be seen that the instant device, though simple and economical in its construction and easily assembled, is highly versatile in its operation and applications. Further, the instant invention provides excellent protection for a motor even though located in a position remote from the motor windings and hence having an ambient relatively unrelated to that of the windings. It can be seen that the construction of the instant device advantageously permits accurate sensing of conditions existing in the windings. This permits complete protection of a motor while at the same time permitting operation of the motor being protected at its maximum rated capabilities without deleterious nuisance trip-outs.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above construction without departing from the scope of the invention, it is intended that all matter contained in the above description or shown in the accompanying drawings, shall be interpreted as illustrative and not in a limiting sense, and it is also intended that the appended claims shall cover all such equipment variations as come within the true spirit and scope of the invention.

I claim:
1. A switch comprising:
   (a) a base formed of an electrically conductive heat transmitting material;
   (b) first and second electrically conductive terminals each of which is mounted on and is electrically insulated from the base;
   (c) a first electrical contact mounted on one of the first and second terminals;
   (d) a thermally responsive member cantilever mounted and electrically connected to at one of its ends on a first portion of the base;
   (e) a second electrical contact mounted on the other end of the thermally responsive member and positioned for movement into and out of engagement with the first contact in response to movement of the thermally responsive member; and
   (f) a heater member, one end of which is electrically connected to a portion of the base and the other end of which is electrically connected to one of the first and second terminals, the heater member and being located along a portion of its length in intimate heat transfer relationship with the thermally responsive member and the first portion of the base.

2. A switch as set forth in claim 1 wherein the first portion of the base comprises a tab member bent out of the base and wherein the tab has an exterior configuration generally conforming to the interior configuration of heater member to provide an intimate heat transfer relationship between the heater member and the tab.

3. A switch as set forth in claim 2 wherein the first contact is mounted on the first terminal and wherein the other end of the heater member is connected to the second terminal.

4. A switch as set forth in claim 3 wherein the base includes a second mounting portion for mounting the base on a suitable surface, the second mounting portion forming a third electrically conductive terminal.

5. A switch comprising:
   (a) a base;
   (b) first and second electrically conductive terminals each of which is mounted on and is electrically insulated from the base;
   (c) a first electrical contact mounted on one of the first and second terminals;
   (d) a thermally responsive snap-acting member cantilever mounted at one of its ends on a portion of the base; the mounting portion of the base being formed of an electrically conductive, heat transmitting material;
   (e) a second electrical contact mounted on the other end of the thermally responsive member and positioned for movement into and out of engagement with the first contact in response to snap movement of the thermally responsive member; and
   (f) a heater member, one end of which is electrically connected to a portion of the base and the other end of which is electrically connected to one of the first and second terminals, the heater member being located along a portion of its length in intimate heat transfer relationship with the thermally responsive member and the mounting portion of the base.

6. A switch as set forth in claim 5 wherein the heater member has a generally U-shaped configuration and wherein the mounting tab has a generally rectangular shape and is in a thermally juxtaposed relation with the heater member.

7. A switch as set forth in claim 6 wherein the base is formed of a substantially planar sheet of electrically conductive heat transmitting material and the tab is struck from and bent out of the plane of the base.

8. A switch as set forth in claim 7 wherein the heater member and the tab member lie in generally the same plane, which plane lies between and is generally parallel to the plane of the disc and the plane of the base.

References Cited by the Examiner

UNITED STATES PATENTS

| | | | |
|---|---|---|---|
| 1,980,756 | 11/1934 | Hoover | 200—122 |
| 2,839,640 | 6/1958 | Epstein | 200—122 X |
| 2,892,910 | 6/1959 | Diebold | 200—113 |
| 2,991,341 | 7/1961 | Ulanet | 200—138 |
| 3,100,827 | 8/1963 | Grimshaw | 200—113 |

BERNARD A. GILHEANY, *Primary Examiner.*

H. M. FLECK, *Assistant Examiner.*